Inventors
Milton B. Hesslein
Andrew T. Anderson

Patented Aug. 22, 1944

2,356,159

UNITED STATES PATENT OFFICE 2,356,159

METHOD OF MACHINING EXPLOSIVES AND APPARATUS THEREFOR

Milton B. Hesslein, Montgomery, Ala., and Andrew T. Anderson, Dover, N. J.

Application September 15, 1942, Serial No. 458,442

6 Claims. (Cl. 29—69)

(Granted under the act of March 3, 1883, as amended April 30, 1928; 370 O. G. 757)

The invention described herein may be manufactured and used by or for the Government for governmental purposes without the payment to us of any royalty thereon.

This invention relates to a method of sectioning detonators and apparatus for the purpose.

It is a recognized fact that detonators and explosives generally must be handled carefully to prevent premature ignition. Explosive components are frequently sectioned to prepare those components for examination and study. The care necessitated thus far by conventional sectioning methods has made such operation very costly. Furthermore, it has not always been possible to prevent untimely explosions, with the result that there has been damage to personnel and apparatus.

It is the object of this invention to provide a method and apparatus for sectioning explosive components with a minimum of risk and a maximum of efficiency. The object is accomplished by using a tool having a rake cutting angle greater than 90°. The component is held in a vise the jaws of which are slotted to permit passage of the sectioning tool. Auxiliary jaws are provided to grip the component intermediate its ends so that the sectioned pieces will not fall apart when the main holding jaws are withdrawn from engagement of the component.

The specific nature of the invention as well as other objects and advantages thereof will clearly appear from a description of a preferred embodiment as shown in the accompanying drawing in which:

Fig. 1 of the drawing is a view in elevation of the apparatus for carrying out the process of the invention.

Figure 6:
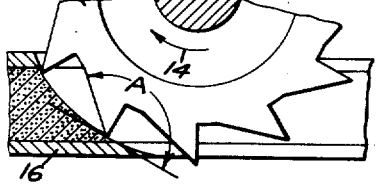
Fig. 6 is a diagram showing tool angles in relation to the work-piece.

Referring to the drawing in detail, a conventional lathe 2 is shown having a bed 4 and a crosshead 6. Power may be belt-supplied to a headstock 8 to turn mandrel 10 on which is mounted rotatable cutting tool 12. Tool 12 may conveniently be a conventional slotting saw mounted for rotation in the reverse direction from that in which it is usually rotated. This use of a conventional slotting saw provides a tool in which the rake cutting angle is greater than 90°, this angle being the angle between a plane tangent to the work and the front face of the cutting tool, and measured from that portion of the plane behind the tool. For a better understanding of the theory, reference is had to Fig. 6, showing two teeth of the slotting saw in contact with the work. Arrow 14 indicates the direction of motion of the cutting tool relatively to the work. The rake cutting angle is represented by the angle A.

Figure 4:
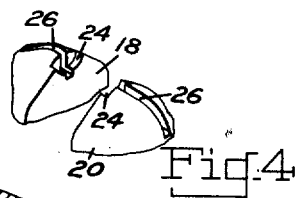
Fig. 4 is a perspective view of the main jaws of the vise.
Figure 5:
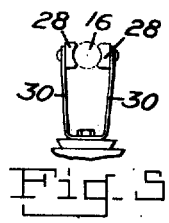
Fig. 5 is a view showing details of the auxiliary jaws.

The work-piece 16 to be slotted is held between the jaws 18 and 20 of a vise mounted on cross-head 6. A hand wheel 22 operates the screw which moves one jaw relatively to the other. Jaws 18 and 20 are preferably recessed as at 24 to receive the ends of the work-piece. The jaws are also relieved or slotted in the direction of motion of the slotting saw as shown at 26 to permit passage of the saw therethrough. The saw slot undercuts the recesses 24, as shown in Fig. 4, to permit sawing through the lower surface of the work-piece.

Auxiliary jaws 28 are mounted on flexible, resilient supports 30, such as leaf springs. Jaws 28 clamp the work-piece intermediate its ends, and serve to hold the sectioned halves against falling apart when the vise jaws have been moved away from supporting relation with the work-piece.

Figure 1:
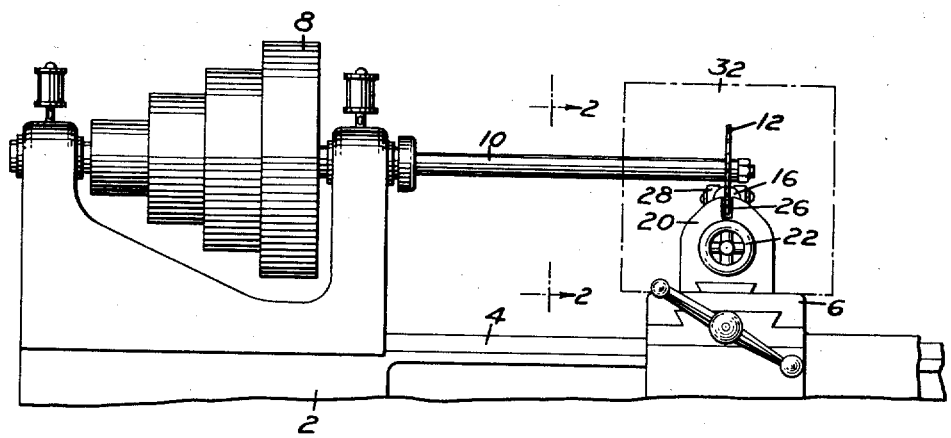

Inasmuch as the present invention relates to work with explosive components, some suitable guard or barrier will preferably be provided to protect the operator in case of accidental ignition of the component. Such a barrier is indicated only in dotted lines at 32 of Fig. 1.

Figure 2:
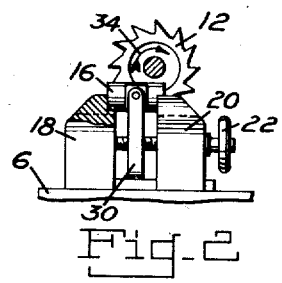
Fig. 2 is a view in section substantially on line 2—2 of Fig. 1.
Figure 3:
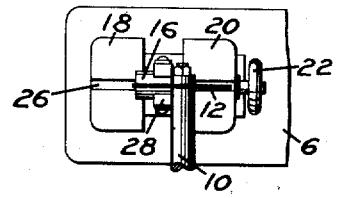
Fig. 3 is a top plan view of Fig. 2.

*Operation.*—The work-piece 16 to be sectioned is clamped between jaws 18 and 20 of the vise. Auxiliary jaws 28 must be sprung apart slightly to receive the work-piece. Guard or barrier 32 is then put in place. With the slotting saw rotating as indicated by arrow 34 in Fig. 2 and arrow 14 in Fig. 6, cross-head 6 is moved across the lathe bed to engage the saw with the component. When the slotting operation is complete, the vise jaws are separated, and the two halves of the sectioned component are removed from auxiliary jaws 28.

The preferred method of feeding the explosive into the cutter is shown in Fig. 6, in which the explosive moves to the right into the cutter. In this method, the direction of feed is against the direction of rotation of the cutter. It will of course be understood that the explosive could be fed into the cutter from the right, instead of from the left, in which case the direction of feed is the same as the direction of rotation of the cutter.

We claim:

1. The method of cutting through an explosive substance comprising applying thereto a tool having a rake cutting angle greater than 90°.

2. The method of sectioning an explosive substance comprising applying a conventional slotting saw thereto and rotating the saw in reverse of its usual direction, so that the rake cutting angle is greater than 90°.

3. A vise to hold a detonator being sectioned comprising a pair of jaws movable relatively to each other, the jaws being relieved to receive the detonator ends, a saw slot through the jaws and aligned with the sectioning tool, said slot extending below the detonator when in position in the vice to permit complete severance of the detonator, and auxiliary jaws positioned to hold the detonator intermediate its ends.

4. In a machine for sectioning a piece of explosive substance along its longitudinal axis by means of a rotary cutter, a vise for presenting the said explosive substance to the cutter comprising, in combination, a pair of jaws movable relatively to each other, each of the said jaws having a recess for seating the said explosive piece in the plane of the said rotary cutter and in underlying relation thereto, the tops of the said pair of jaws being slotted in the plane of the said rotary cutter to provide clearance therefor.

5. In a machine for sectioning a piece of explosive substance along its longitudinal axis by means of a rotary cutter, in combination, a pair of jaws movable relatively to each other for holding the ends of the said piece to present it in the plane of the said rotary cutter and in underlying relation thereto, and a pair of auxiliary jaws positioned midway between the first said pair of jaws adapted to hold the sectioned components of the said explosive piece.

6. The combination according to claim 5 wherein the said pair of auxiliary jaws are spring mounted.

MILTON B. HESSLEIN.
ANDREW T. ANDERSON.